United States Patent
Ikeda et al.

(10) Patent No.: US 7,303,291 B2
(45) Date of Patent: Dec. 4, 2007

(54) ILLUMINATION APPARATUS AND VIDEO PROJECTION DISPLAY SYSTEM

(75) Inventors: Takashi Ikeda, Higashiosaka (JP); Kazuhiro Arai, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 327 days.

(21) Appl. No.: 11/088,722

(22) Filed: Mar. 25, 2005

(65) Prior Publication Data
US 2005/0219847 A1    Oct. 6, 2005

(30) Foreign Application Priority Data
Mar. 31, 2004    (JP)    ............... 2004-104413

(51) Int. Cl.
G03B 21/26    (2006.01)
G03B 21/28    (2006.01)
G03B 21/20    (2006.01)
B60Q 1/26    (2006.01)
F21V 9/00    (2006.01)

(52) U.S. Cl. ............... 353/102; 353/94; 353/99; 359/649; 362/227; 362/331

(58) Field of Classification Search .......... 353/20, 353/33, 34, 94, 97, 102, 31, 69, 70, 81, 99; 349/8, 9; 362/231, 331, 227, 551; 359/642, 359/649
See application file for complete search history.

(56) References Cited

U.S. PATENT DOCUMENTS

| 5,662,401 A | * | 9/1997 | Shimizu et al. ............... 353/38 |
| 6,921,176 B2 | * | 7/2005 | Tomita et al. ............... 353/94 |
| 7,070,281 B2 | * | 7/2006 | Kato ............... 353/20 |
| 7,101,050 B2 | * | 9/2006 | Magarill et al. ............... 353/97 |

FOREIGN PATENT DOCUMENTS

JP    10-123512    5/1998

* cited by examiner

*Primary Examiner*—Melissa Jan Koval
(74) *Attorney, Agent, or Firm*—McDermott Will & Emery LLP

(57) ABSTRACT

An illumination apparatus includes: a group of light source segments; a group of condenser lenses arrayed as opposed to the group of light source segments, and a group of rectangular lens elements arrayed as opposed to the group of condenser lenses for converging a light ray transmitted through the opposing condenser lens; and an illumination optical system for guiding the rays to an illumination plane. The lens elements have a shape of a rectangle and are arrayed in a rectangular effective area in such a way that a longitudinal axis of each lens elements intersects an axis passing a side of the effective area at 45°.

31 Claims, 7 Drawing Sheets

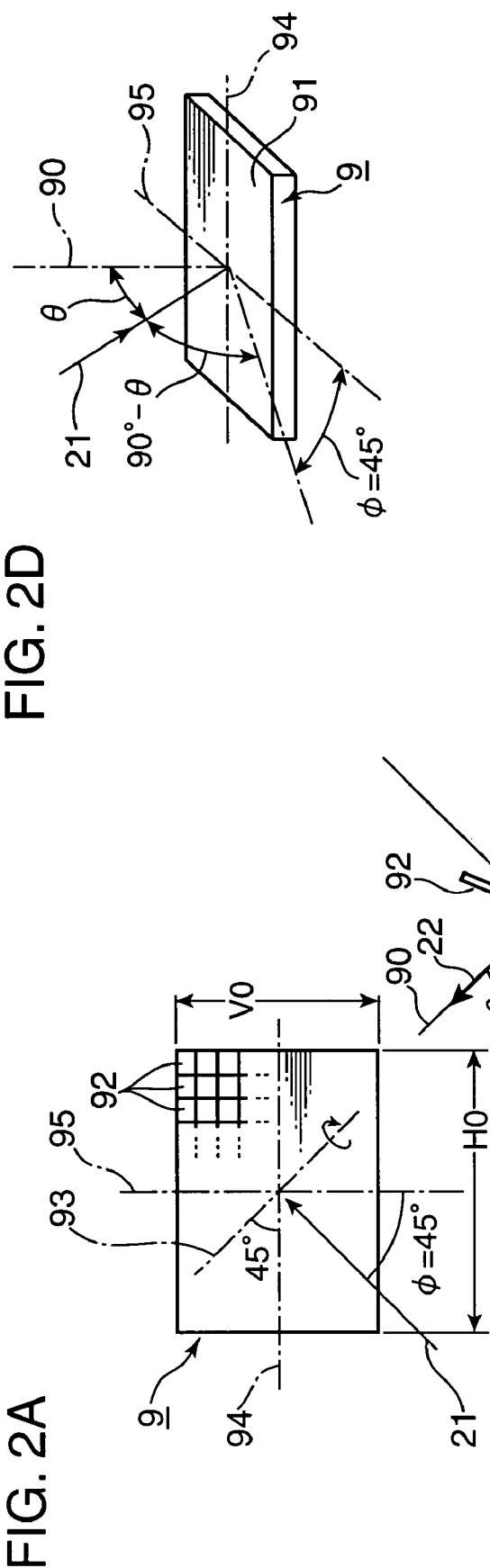

$D_{max} \rightarrow \theta_{max}$
$D_{min} \rightarrow \theta_{min}$
$W = D_{max} - D_{min}$ $$\frac{H}{V} = \frac{H0}{V0}$$

$$\frac{H}{V} \leqq 2$$

$P = a = b = \sqrt{2} \cdot V$ $$\frac{H}{V} = \frac{H0}{V0}$$

$$\frac{H}{V} > 2$$

$$P = c = d = \frac{1}{\sqrt{2}} H$$

ILLUMINATION APPARATUS AND VIDEO PROJECTION DISPLAY SYSTEM

BACKGROUND OF THE INVENTION

1. Field of the Invention

The present invention relates to a video projection display system of projecting and displaying a light image which has been obtained by modulating projected light, and an illumination apparatus for use in the video projection display system.

2. Description of the Related Art

There has been known a video projection display system of projecting and displaying, onto a screen or a like apparatus, a light image which has been obtained by modulating light rays from a light source based on an image signal pixel by pixel (e.g., in Japanese Unexamined Patent Publication No. 10-123512). The video projection display system disclosed in the publication employs a liquid crystal display (LCD) device, which is a light transmissive device, as a device (called as "light valve") which modulates incident light from a light source. Further, the video projection display system uses an LED array comprised of a multitude of light emitting diode (LED) devices in an array, as a light source, to increase the light amount of projected light, and a group of condenser lenses which are disposed in front of the respective LED devices to substantially converge light rays outgoing from the respective LED devices into parallel rays.

It is desirable to use a light reflective device as shown by a digital micro mirror device (DMD), as a light valve, to increase the light amount of projected light. A system incorporated with the light reflective device has a merit that it is free from polarization dependency, namely, there is no need of using a polarized ray as an incident ray, unlike a system using a LCD device. The system using the light reflective device has been designed in an attempt to obtain a projected light image having a large light amount with use of a light source having the same light amount.

However, in case of using a DMD as a light valve, it is necessary to allow light to be incident onto a light receiving plane of the DMD with a direction of about 45° with respect to one side of the light receiving plane. Accordingly, in the case where an LED array is used as a light source, there is assumed an arrangement pattern as shown in FIG. 6A, for instance, wherein respective lens elements constituting a fly-eye lens are arrayed as opposed to the LED array to converge a bundle of rays generated in the LED devices. Specifically, a lens element 33 constituting the fly-eye lens opposing to a corresponding LED device 31 has a rectangular shape corresponding to the shape of the light receiving plane of the DMD, and is arranged in such a manner that one side of the lens element 33 is tilted relative to one side of a square effective area 30 by 45°, wherein the effective area 30 is defined by an optical system as an area capable of arranging all the lens elements 33 of the fly-eye lens.

In the arrangement pattern as shown in FIG. 6A, there is left a useless area in the effective area 30 where the lens unit 33 cannot be arranged. Furthermore, since the lens elements 33 are arrayed close to each other substantially without clearance, the LED devices 31 corresponding to these lens elements 33 are resultantly arranged close to each other, which may lower heat releasing ability of dissipated heat. If the heat releasing ability of dissipated heat of the LED array is lowered, it is highly likely that temperature rise in the LED array is intolerable. Such a phenomenon may obstruct miniaturization of the illumination apparatus and the video projection display system.

SUMMARY OF THE INVENTION

In view of the problems residing in the prior art, it is an object of the present invention to provide a video projection display system that enables to achieve balance between the light amount of projected light, and heat releasing effect of a light source, and an illumination apparatus for use in the video projection display system.

An aspect of the invention is directed to an illumination apparatus comprising: a light source including a group of light source segments arranged in an array; a lens array including a group of condenser lenses arrayed as opposed to the group of light source segments, and a group of rectangular lens elements arrayed as opposed to the group of condenser lenses, each of the lens elements converging a light ray that has been generated in the opposing light source segment and has been transmitted through the opposing condenser lens; and an illumination optical system which converges the rays that have been transmitted through the lens elements in such a manner that the rays are obliquely and superimposedly incident onto an illumination plane one over the other, wherein the lens elements are arrayed in a rectangular effective area with a clearance from each other, the effective area being defined by the illumination optical system as an area capable of arranging the lens elements, and one side of each of the lens elements being tilted relative to one side of the effective area by 45°.

These and other objects, features and advantages of the present invention will become more apparent upon reading of the following detailed description along with the accompanying drawings.

BRIEF DESCRIPTION OF THE DRAWINGS

FIGS. 2A through 2D are illustrations for explaining a function of a DMD in the video projection display system shown in FIG. 1.

DETAILED DESCRIPTION OF THE PREFERRED EMBODIMENTS

Figure 1:
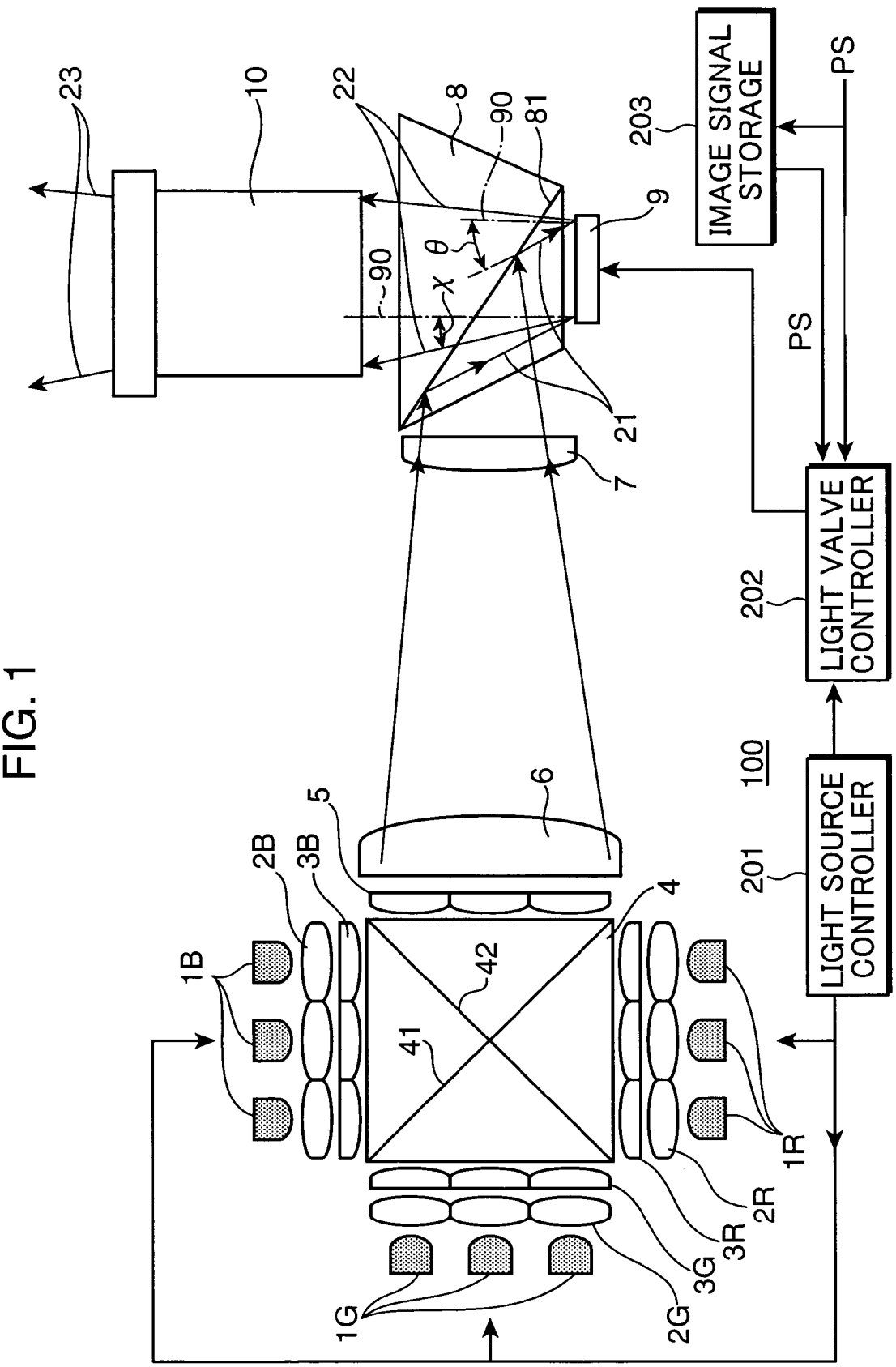
FIG. 1 is an illustration showing primary components of a video projection display system embodying the invention.

FIG. 1 is an illustration showing primary components of a video projection display system embodying the invention. The video projection display system 100 comprises light emitting diode (LED) arrays 1R, 1G, and 1B, condenser lens groups 2R, 2G, and 2B, first fly-eye lenses 3R, 3G, and 3B, a dichroic prism 4, a second fly-eye lens 5, a first condenser lens 6, a second condenser lens 7, a TIR prism 8, a digital micro mirror device (DMD) 9, a projection lens 10, a light source controller 201, a light valve controller 202, and an image signal storage 203.

The entirety or each of the LED arrays 1R, 1G, and 1B corresponds to an example of a light source of the invention. Further, in the case where the entirety of the LED arrays 1R, 1G, and 1B serves as an example of the light source of the invention, the LED arrays 1R, 1G, and 1B correspond to a first light source, a second light source, and a third light source of the invention, respectively. Further, the condenser lens groups 2R, 2G, and 2B, and the first fly-eye lenses 3R, 3G, and 3B constitute an example of a lens array of the invention. The dichroic prism 4 which forms an optical path along which light rays transmitted through the first fly-eye lenses 3R, 3G, and 3B are guided to the DMD 9, the second fly-eye lens 5, the first condenser lens 6, the second condenser lens 7, and the TIR prism 8 constitute an example of an illumination optical system of the invention. Among the components constituting the illumination optical system, the dichroic prism 4 corresponds to an example of color synthesizing unit of the invention. Further, the DMD 9 corresponds to an example of a light valve of the invention, and the projection lens 10 corresponds to an example of a projection optical system of the invention. Further, components of the video projection display system from the LED arrays 1R, 1G, 1B up to the TIR prism 8 on the optical path, namely, the components for irradiating light onto the DMD 9 correspond to an example of an illumination apparatus of the invention having the DMD 9 as an illumination plane thereof.

The LED arrays 1R, 1G, and 1B are constructed such that LEDs of generating light of red color (hereinafter, sometimes called as "red rays"), light of green color (hereinafter, sometimes called as "green rays"), and light of blue color (hereinafter, sometimes called as "blue rays") are arrayed in a matrix, respectively. The condenser lens groups 2R, 2G, and 2B are disposed as opposed to the LED arrays 1R, 1G, and 1B, respectively, and are adapted to converge divergent rays emitted from the LED arrays 1R, 1G, and 1B in a wide range into substantially parallel rays. Lens elements constituting the condenser lens group 2R (2G or 3B) are arranged as opposed to the LEDs constituting the LED array 1R (1G or 1B), individually. Each of the LEDs constituting the LED array 1R (1G or 1B) corresponds to an example of a light source segment of the invention.

The first fly-eye lenses 3R, 3G, and 3B are arranged as opposed to the LED arrays 1R, 1G, and 1B, respectively, and adapted to converge light rays that have been generated in the opposing LED arrays 1R, 1G, and 1B, and have been transmitted through the condenser lens groups 2R, 2G, and 2B, respectively. The first fly-eye lens 3R (3G or 3B) is comprised of lens elements arrayed in a matrix, wherein the lens elements are opposed to the LEDs of the LED array 1R (1G or 1B) in one-to-one correspondence. Further, each of the lens elements has a rectangular shape corresponding to the configuration of the DMD 9. A bundle of rays each having a rectangular shape and transmitted through the corresponding lens element are guided to the DMD 9 via the illumination optical system located downstream.

The dichroic prism 4 has a cubic shape or a rectangular parallelepiped shape, and is constituted of four pieces of right-angle prisms jointed to each other. A first dichroic mirror section 41 which reflects blue rays that have been transmitted through the first fly-eye lens 3B at an incident angle of 45° at a right angle, and which transmits red rays and green rays, and a second dichroic mirror section 42 which transmits green rays and blue rays are formed at the joint parts of the dichroic prism 4. With this arrangement, the red, green, and blue rays that have been transmitted through the first fly-eye lenses 3R, 3G, and 3B respectively are incident onto the second fly-eye lens 5.

Similarly to the first fly-eye lenses 3R, 3G, and 3B, the second fly-eye lens 5 has lens elements arrayed in a matrix, wherein each of the lens elements has a rectangular shape. The lens elements constituting the second fly-eye lens 5 converge the rays that have been transmitted through the lens elements of the first fly-eye lenses 3R, 3G, and 3B, individually. In view of this, the lens elements constituting the second fly-eye lens 5 each has a size and an arrangement pattern analogous to those of each of the lens elements constituting the first fly-eye lens 3R (3G or 3B). Preferably, in view of feasibility of designing, as shown in FIG. 1, the group of lens elements constituting the second fly-eye lens 5 is identical to the group of lens elements constituting the first fly-eye lens 3R (3G or 3B) in size and arrangement pattern. In this embodiment, each of the lens elements constituting the first fly-eye lens 3R (3G or 3B), and the second fly-eye lens 5 is depicted as a single convex lens element. The invention is not limited to this.

The rays transmitted through the second fly-eye lens 5 are converged onto the first condenser lens 6 and the second condenser lens 7, have their propagating directions bent by the TIR prism 8, and are guided to the DMD 9. The first condenser lens 6 is adapted to irradiate the bundle of rays transmitted through the lens elements constituting the second fly-eye lens 5 superimposedly one over the other onto the DMD 9. The second condenser lens 7 is adapted to guide the bundle of rays that have been superimposedly incident one over the other toward the DMD 9 precisely. The TIR prism 8 guides the rays transmitted through the second condenser lens 7 onto the DMD 9 by reflecting all the rays on a TIR plane 81 of the TIR prism 8.

FIGS. 2A through 2D are illustrations for explaining a function of the DMD 9. A micro device which is fabricated by integrating movable/deformable mechanisms such as a microactuator and a sensor, and their driving circuits (or controlling circuits) by using a micromachining technology based on a semiconductor processing is referred to as "Micro Electro Mechanical System (MEMS)". As shown in FIGS. 2A and 2D, the DMD 9 is constructed such that a number of micro mirrors (namely, miniaturized mirrors) 92 corresponding to the number of pixels of an image to be displayed are arrayed on a primary plane of a semiconductor substrate functioning as a light receiving plane 91 on which an incident ray 21 is to be received. Each of the micro mirror 92 is pivoted about a pivot axis 93 which is tilted by 45° relative to axes 94 and 95 which are parallel with two sides of the light receiving plane 91. As each micro mirror 92 is pivoted, its reflecting plane is tilted in a range from e.g., −10° to +10° based on a reference position parallel to the light receiving plane 91.

As shown in FIG. 2B, in the case where the micro mirror 92 is pivoted by −10°, for instance, after having been transmitting through the TIR prism 8, an incident ray that is obliquely incident onto the light receiving plane 91 with a certain incident angle θ is reflected in a direction of a normal line 90 on the light receiving plane 91. In this example, the incident angle θ is 20°. Further, an outgoing ray 22 reflected on the light receiving plane 91 in the direction of the normal line 90 is incident onto the projection lens 10 after having been transmitted through the TIR plane 81 without causing total reflection on the TIR plane 81 of the TIR prism 8 (see FIG. 1).

On the other hand, as shown in FIG. 2C, in the case where the micro mirror 92 is pivoted by +10°, for instance, the incident ray 21 is reflected in a direction largely away from the normal line 90. At this time, the outgoing ray 22 is not incident onto the TIR plane 81 of the TIR prism 8, or is not incident onto the projection lens 10 even if it is incident onto the TIR plane 81 (see FIG. 1). In this way, the outgoing rays 22 outgoing from the light receiving plane 91 of the DMD 9 are selectively incident onto the projection lens 10, as far as the angle of emergence $\Psi$ lies in a predetermined range.

The tilts of the respective micro mirrors 92 are controlled individually by the light valve controller 202 based on an image signal PS. While the micro mirror 92 is set to a tilt (e.g., −10°) where the outgoing ray 22 is allowed to be incident onto the projection lens 10, the micro mirror 92 is in an ON state. While the micro mirror 92 is set to a tilt (e.g., +10°) where incidence of ray is blocked, the micro mirror 92 is in an OFF state. The light valve controller 202 controllably turns on and off the micro mirrors 92 corresponding to the respective pixels individually. The controlling system is preferably a pulse width modulation (PWM) system. In case of using the PWM control, the light valve controller 202 prolongs an ON-time duration of the micro mirror 92 corresponding to a target pixel in accordance with brightness of the target pixel. Thus, gradations of the respective pixels are determined based on the image signal.

The light source controller 201 successively turns on the LED arrays 1R, 1G, and 1B of generating light rays of red, green, and blue by timesharing. The light valve controller 202 controls the micro mirrors 92 based on the image signal PS in synchronism with turning on of the light source controller 201. As a result, a color light image is displayable on an external screen (not shown) in terms of outgoing rays 23 from the projection lens 10. The image signal PS may include a still image signal other than a moving image signal.

Referring back to FIGS. 2A through 2D, the aspect ratio of the rectangular light receiving plane 91, namely, the ratio (=H0/V0) of a longer side H0 thereof to a shorter side V0 thereof corresponds to an aspect ratio of an image to be displayed. For instance, in displaying an image in conformity with NTSC, which is a standardized specification of television broadcasting, the aspect ratio of the light receiving plane 91 is set to 4/3; in displaying an image in conformity with a specification of high-definition television (HDTV) broadcasting, the aspect ratio is set to 16/9; and in displaying an image in conformity with a specification of SXGA, which is used for a display monitor of a personal computer, the aspect ratio is set to 5/4.

The light valve controller 202 may receive the image signal PS on real-time basis from an external device, or may be read from the image signal storage 203 if the system has the image signal storage 203. Various medium including a semiconductor memory such as a RAM, and a magnetic recording medium such as a compact hard disk are usable as the image signal storage 203. Further, the light valve controller 202 and the light source controller 201 may be constituted of a hardware without need of a software, or may be constituted of a microcomputer operated based on a software.

As shown in FIGS. 2A and 2D, it is idealistic that the incident ray 21 is incident onto the light receiving plane 91 along a plane orthogonal to the pivot axis 93. In other words, it is idealistic that the incident ray 21 is incident onto the light receiving plane 91 with a direction $\phi$ of 45° with respect to the axis 94 or the axis 95. It is necessary that the direction $\phi$ lies in a certain range including 45°, so that the incident ray 21 is reflected on the micro mirror 92, and is incident onto the projection lens 10 as the outgoing ray 22 while the micro mirror 92 is in an ON state. The illumination optical system constituted of the dichroic prism 4, the second fly-eye lens 5, the condenser lens 6, the condenser lens 7, and the TIR prism 8 is constructed to allow the incident ray 21 to be incident onto the light receiving plane 91 with the direction $\phi$ in the allowable range. Similarly, there is an allowable range regarding the incident angle $\theta$. Accordingly, the illumination optical system is so constructed as to allow the incident ray 21 to be incident onto the light receiving plane 91 with the incident angle $\theta$ in the allowable range.

Figure 3A:
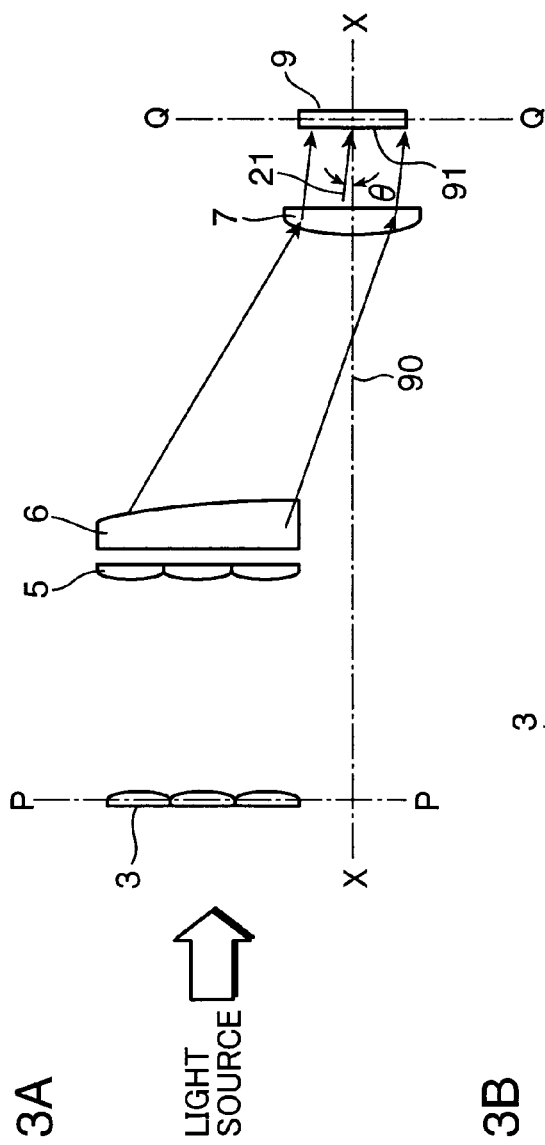
FIGS. 3A through 3C are illustrations for explaining an operation principle of an illumination optical system of the video projection display system shown in FIG. 1.
Figure 3C:
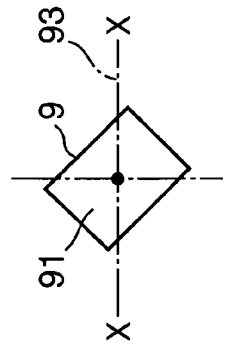
Figure 3B:
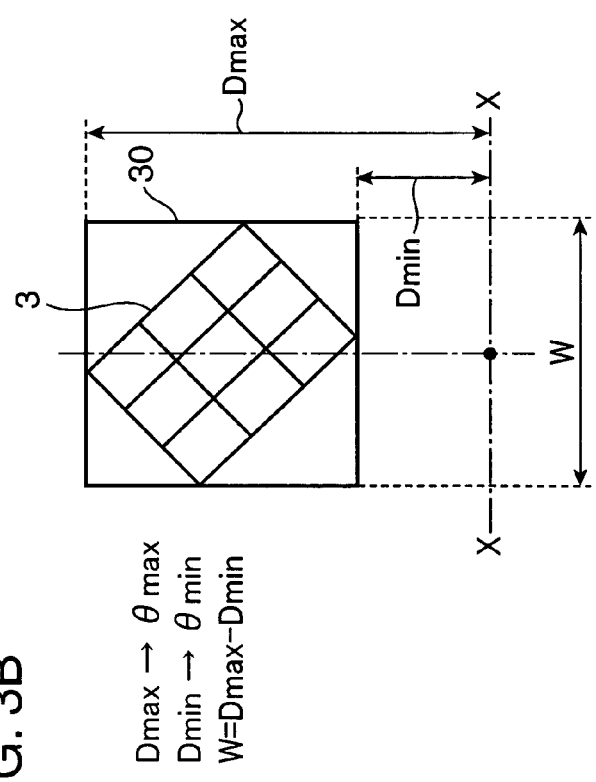

FIGS. 3A through 3C are illustrations for explaining a relation between the shape and the position of the first fly-eye lens (hereinafter, the first fly-eye lens as a representative of the first fly-eye lenses 3R, 3G, and 3B is referred to as "first fly-eye lens 3"), and the shape and the position of the light receiving plane 91 of the DMD 9 in a simplified manner. In FIG. 3A, the optical path is depicted in a state that change of the propagating direction of light by the dichroic prism 4 and the TIR prism 8 is omitted. Let it be assumed that the light receiving plane 91 is placed on a plane Q-Q, and the first fly-eye lens 3 is placed on a plane P-P parallel to the plane Q-Q. Further, let us assume a plane X-X including the normal line 90 passing the center of the light receiving plane 91, and the pivot axis 93 passing the center of the light receiving plane 91. FIG. 3A depicts an arrangement of the illumination optical system and its peripheral parts viewed from a direction parallel to all the planes P-P, Q-Q, and X-X, namely, from a direction along an intersection line of the plane P-P and the plane X-X, or along an intersection line of the plane Q-Q and the plane X-X. FIG. 3B is a front view of the first fly-eye lens 3 on the plane P-P, and FIG. 3C is a front view of the DMD 9 on the plane Q-Q.

The first fly-eye lens 3 is constituted of nine rectangular lens elements, for instance. A bundle of rays transmitted through these lens elements of the first fly-eye lens 3 are superimposedly received on the light receiving plane 91 one over the other by the optical system constituted of the second fly-eye lens 5, the condenser lens 6, and the second condenser lens 7. In view of this, the shape of each of the lens elements is analogous to the shape of the light receiving plane 91. The aspect ratio of each of the lens elements and the aspect ratio of the light receiving plane 91 are identical to each other.

In the illumination optical system having the above arrangement, the incident angle $\theta$ of the incident ray 21 onto the light receiving plane 91 lies in a certain range from $\theta$ min to $\theta$ max, which lies within the above-mentioned allowable range. The distance from each of the lens elements to the plane X-X is required to fall in a range from D min to D max corresponding to the range of the incident angle $\theta$ from $\theta$ min to $\theta$ max, so that a bundle of rays transmitted through the lens elements of the first fly-eye lens 3 are each incident onto the light receiving plane 91 with the incident angle $\theta$ lying in the range from $\theta$ min to $\theta$ max.

Further, it is desirable to arrange the lens elements constituting the first fly-eye lens 3 within the width W equal to the value (D max−D min) on the plane X-X to effectively utilize the aperture of the projection lens 10. In view of this, in the illumination optical system, a square effective area 30 is defined as an area capable of arranging all the lens elements (in this case, nine lens elements). For sake of simplifying the explanation, FIGS. 3A through 3C show an example in which the plane P-P where the first fly-eye lens 3 is located, and the plane Q-Q where the DMD 9 is located are parallel to each other. However, there is a case that the plane P-P and the plane Q-Q are not parallel to each other depending on the optical path. Even in such a case, it is easily understandable from the above description based on FIGS. 3A through 3C that the effective area has a generally square shape. Accordingly, even if the dichroic prism 4 and the TIR prism 8 are arranged on the optical path as shown in FIG. 1, the square effective area 30 is defined based on the arrangement of the illumination optical system, as in the above case.

As mentioned above, the direction $\phi$ of the incident ray 21 is required to fall in the certain range including 45°. In view of this, as shown in FIG. 3B, one side of each of the rectangular lens elements constituting the first fly-eye lens 3 is tilted by 45° relative to one side of the effective area 30. In this case, as shown in FIG. 3B, if the lens elements constituting the first fly-eye lens 3 are arranged close to each other substantially without a clearance, the interval of the adjoining LEDs constituting the LED array (hereinafter, the LED array as a representative of the LED arrays 1R, 1G, and 1B is referred to as "LED array 1", although not so shown in the drawings) is decreased accordingly. As a result, heat releasing ability of dissipated heat from the LED array 1 is lowered, which may give rise to intolerable temperature rise in the LED array 1.

As will be described referring to FIGS. 4A through 5B, the video projection display system 100 as the embodiment of the invention is constructed such that the lens elements constituting the first fly-eye lens 3 are arranged spaced apart from each other by an interval in accordance with a rule. Thereby, the video projection display system 100 enables to raise heat releasing effect while securing the light amount of the LED array 1, and consequently, securing the light amount of illumination light onto the light receiving plane 91, and the light amount of projected light from the projection lens 10.

Figure 4A:
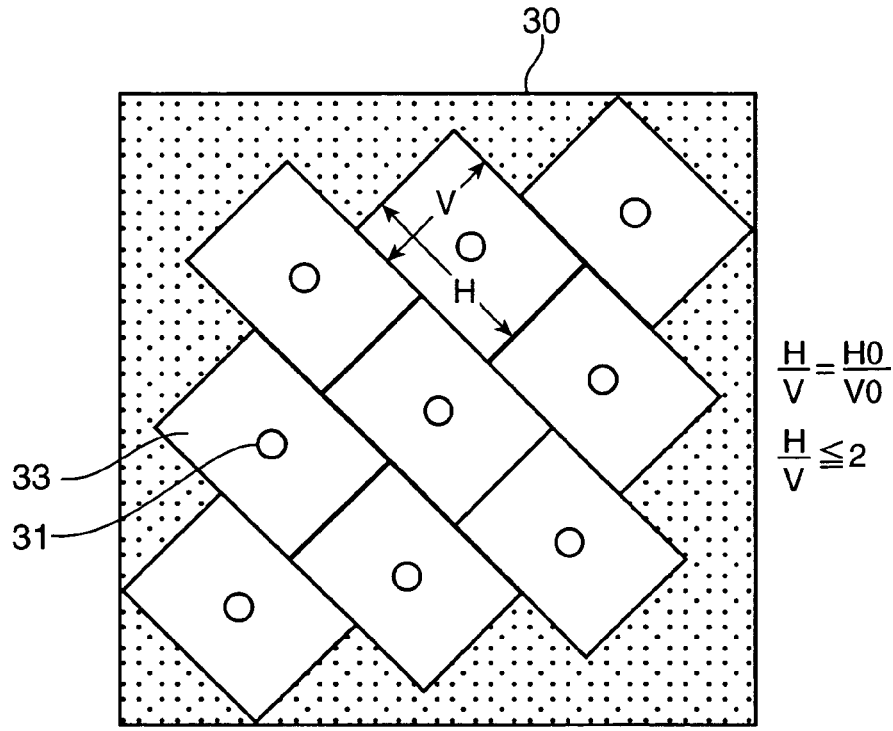
FIGS. 4A and 4B are front views respectively showing a comparative example, and an example of a preferred arrangement pattern of lens elements in the video projection display system shown in FIG. 1.
Figure 4B:
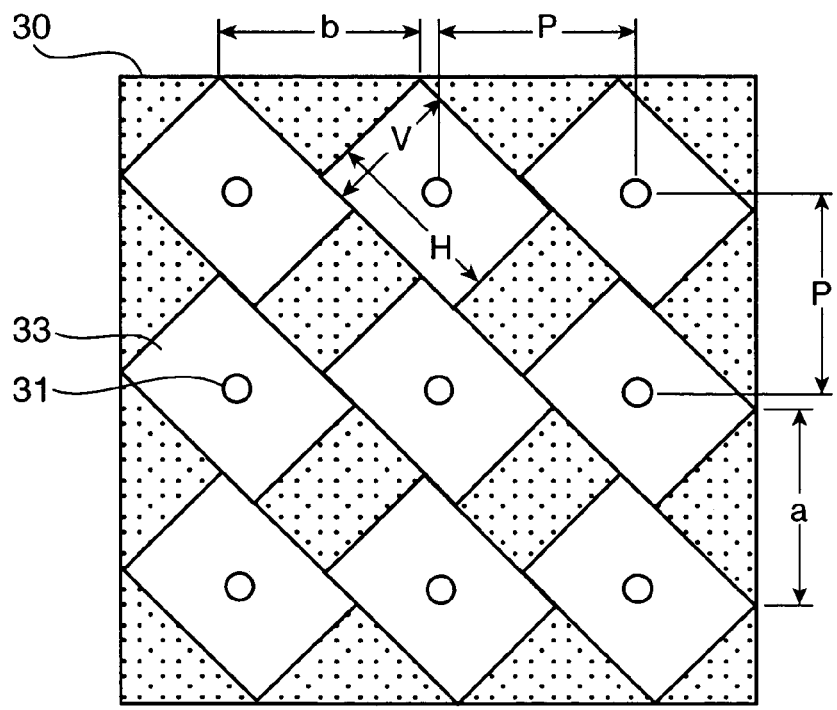

FIGS. 4A and 4B respectively show a comparative example, and an example of a preferred arrangement pattern of the lens elements 33 in the case where the aspect ratio (=H0/V0) of the light receiving plane 91 is 2 or smaller, and accordingly, the aspect ratio (=H/V) of each of the rectangular lens elements 33 constituting the first fly-eye lens 3 is 2 or smaller. Here, the longer side of the lens element 33 is H, and the shorter side thereof is V. As described above, there is established a relation: HV=H0/V0. In FIGS. 4A through 6B, each of the lens elements constituting the first fly-eye lens 3 is denoted by the reference numeral 33, and each of the LEDs constituting the LED array 1 is denoted by the reference numeral 31.

As shown in FIG. 4A, generally, there is left a useless area where the lens elements 33 cannot be arranged, around the group of lens elements 33 within the effective area 30, even if the lens elements 33 each having the aspect ratio of 2 or smaller are arrayed with a possible highest density substantially without a clearance to each other. On the other hand, as shown in FIG. 4B, in the video projection display system 100, the lens elements 33 are arrayed along two sides of the effective area 30 orthogonal to each other with a pitch P=$\sqrt{2}\cdot$V. Thereby, the lens elements 33 can be arrayed discretely with a possible lowest density within the effective area 30 by utilizing the useless area while securing the same number of lens elements 33 as in FIG. 4A. The symbol "$\sqrt{}$" stands for square root.

Referring to FIG. 4B, the length a of the hypotenuse of an isosceles triangle (space) which is defined by one side of the effective area 30 and two lens elements 33 each of which adjoins the side of the effective area 30 and which are adjacent to each other, and the length b of the hypotenuse of an isosceles triangle (space) which is defined by another side of the effective area 30 and two lens elements 33 each of which adjoins the another side of the effective area 30 and which are adjacent to each other are each $\sqrt{2}$ times as long as the shorter side V of the lens element 33. On the other hand, the hypotenuses a and b each equals to the pitch P of the lens elements 33. Accordingly, in FIG. 4B, the pitch P coincides with $\sqrt{2}\cdot$V.

In the case where the aspect ratio (=H0/V0) of the light receiving plane 91 is 2, in FIG. 4B, the lens elements 33 are arrayed substantially without a clearance. Such an arrangement pattern is proposed to maximize the light amount of the LED array 1 in the given effective area 30, and is an arrangement pattern which priorities the light amount over heat releasing effect, considering balance between the light amount of the LED array 1, and heat releasing effect of dissipated heat.

Figure 5A:
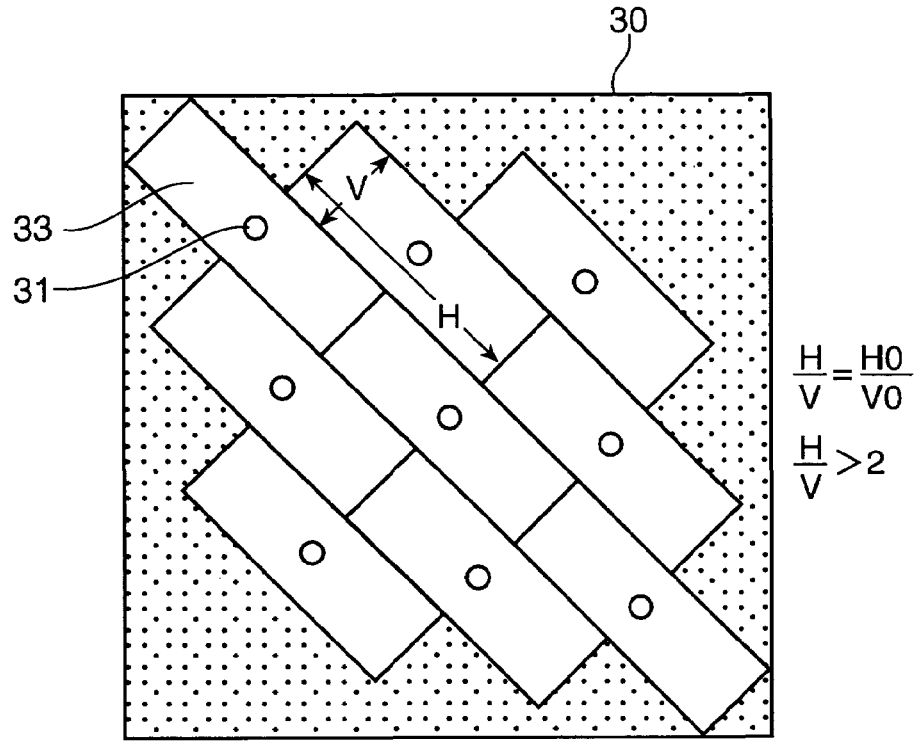
FIGS. 5A and 5B are front views respectively showing a comparative example, and another example of a preferred arrangement pattern of lens elements in the video projection display system shown in FIG. 1.
Figure 5B:
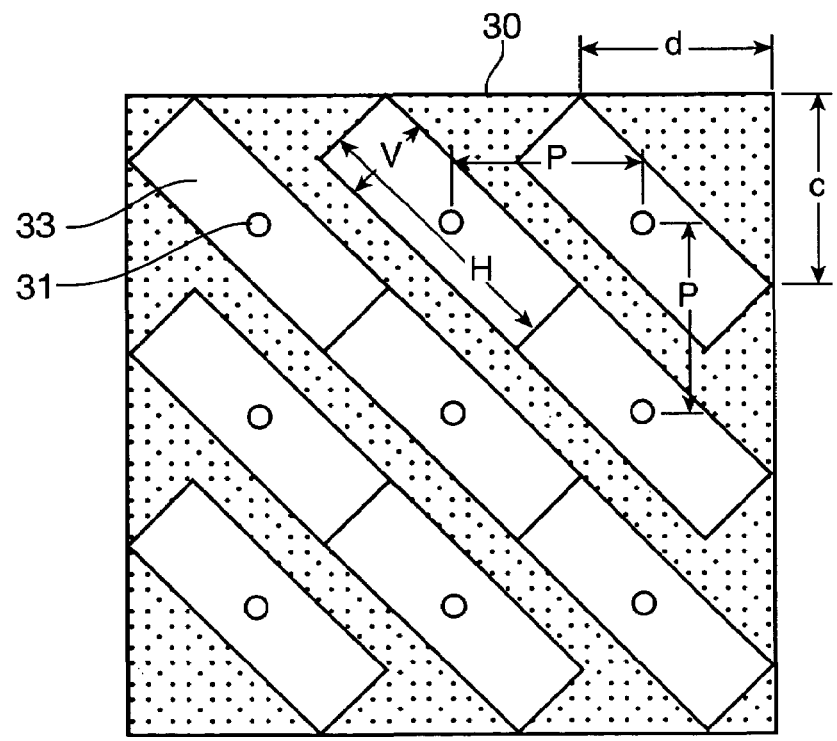

FIGS. 5A and 5B respectively show a comparative example, and an example of a preferred arrangement pattern of the lens elements 33 in the case where the aspect ratio (=H0/V0) of the light receiving plane 91 exceeds 2, and accordingly, the aspect ratio (=H/V) of each of the rectangular lens elements 33 constituting the first fly-eye lens 3 exceeds 2. As shown in FIG. 5A, generally, there is left a useless area around the group of lens elements 33 within the effective area 30, even if the lens elements 33 each having the aspect ratio exceeding 2 are arrayed with a possible highest density substantially without a clearance to each other.

On the other hand, as shown in FIG. 5B, in the video projection display system 100, the lens elements 33 are arrayed along two sides of the effective area 30 orthogonal to each other with a pitch P=$(1/\sqrt{2})\cdot$H. Thereby, the lens elements 33 can be arrayed discretely with a possible lowest density within the effective area 30 by utilizing the useless area while securing the same number of lens elements 33 as in FIG. 5A. Referring to FIG. 5B, the length c and the length d of the equilateral sides of an isosceles triangle (space) which is defined by a corner of the effective area 30 and a lens element 33 most proximate thereto are each $(1/\sqrt{2})$ times as long as the longer side H of the lens element 33. On the other hand, the equilateral sides c and d each equals to the pitch P of the lens elements 33. Accordingly, in FIG. 5B, the pitch P coincides with $(1/\sqrt{2})\cdot$H.

The number of the lens elements 33 is kept the same between the arrangements shown in FIGS. 4A and 4B, and between the arrangements shown in FIG. 5A and FIG. 5B. Accordingly, the number of the LEDs 31 constituting the LED array 1 is kept the same between the arrangements shown in FIG. 4A and 4B, and between the arrangements shown in FIG. 5A and 5B. Further, since the lens elements 33 are arranged within the effective area 30 identical to each other between the arrangements shown in FIGS. 4A and 4B, and between the arrangements shown in FIGS. 5A and 5B, the light amount of illumination light on the light receiving plane 91, and consequently, the light amount of projected light from the projection lens 10 are kept the same between the arrangements shown in FIG. 4A and FIG. 4B, and between the arrangements shown in FIG. 5A and FIG. 5B.

On the other hand, since the lens elements 33 are arrayed discretely with a possible lowest density, the LEDs 31 opposing the lens elements 33 are arrayed discretely with a possible lowest density in the arrangements shown in FIGS. 4B and 5B, as compared with the arrangements shown in FIGS. 4A and 5A. Thereby, heat releasing effect of the LED array 1 is raised in the arrangements shown in FIGS. 4B and 5B, as compared with the arrangements shown in FIGS. 4A and 5A. Thus, by taking the arrangements shown in FIGS. 4B and 5B, heat releasing effect of the LED array 1 as a light source can be raised while securing the light amount of illumination light on the light receiving plane 91, and the light amount of projected light from the projection lens 10. These features contribute to miniaturization of the illumination apparatus and the video projection display system 100.

Figure 6A:
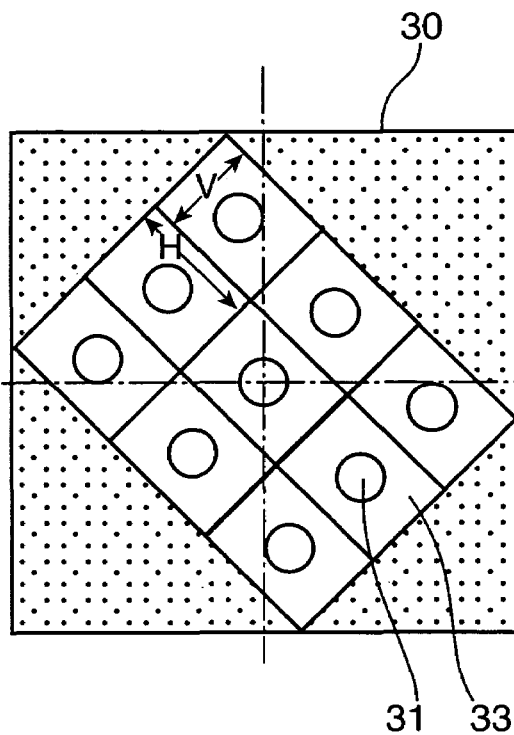
FIGS. 6A and 6B are front views respectively showing a comparative example, and the example of the arrangement pattern shown in FIG. 4B.
Figure 6B:
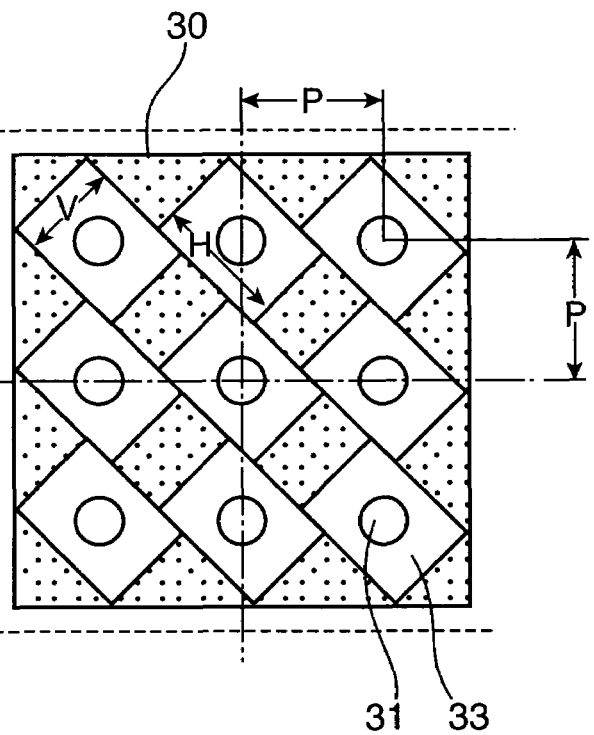

FIGS. 6A and 6B are illustrations for explaining the merits of taking the arrangement shown in FIG. 4B in the case where the lens elements 33 of the number less than the possible maximum number are arranged in the effective area 30. In FIGS. 6A and 6B, the aspect ratio of each lens element 33 is not larger than 2. In FIG. 6A, the lens elements 33 of the number less than the possible maximum number are densely arranged. In FIG. 6B, the same number of lens elements 33 as in FIG. 6A are arranged in the same manner as in FIG. 4B. Specifically, in FIG. 6B, the lens elements 33 are arranged discretely, with the area of the effective area 30 being reduced as compared with the arrangement shown in FIG. 6A. In this way, by taking the arrangement shown in FIG. 4B or FIG. 5B, the effective area 30 can be minimized, and consequently, the illumination apparatus and the video projection display system 100 can be miniaturized.

It is possible to take the following modifications (I) through (IX) other than the foregoing embodiment.

(I) In the above embodiment, the lens elements 33 constituting the first fly-eye lens 3 are arranged as shown in FIG. 4B or FIG. 5B. Alternatively, it is possible to set the pitch P less than $\sqrt{2} \cdot V$ in FIG. 4B while retaining the clearance between the adjoining lens elements 33, for instance. Similarly, it is possible to set the pitch P less than $(1/\sqrt{2}) \cdot H$ in FIG. 5B while retaining the clearance between the adjoining lens elements 33, for instance. In any of the altered arrangements, as compared with the arrangement shown in FIG. 4A or FIG. 5A, sufficient heat releasing effect is obtainable while securing the light amount of the illumination apparatus and the light amount of the video projection display system.

Further, generally, the fly-eye lens 3 is configured such that the lens elements 33 of the number less than the possible maximum number are arrayed spaced apart from each other with a clearance in the effective area 30. In such a case, a clearance may be defined between each of the lens elements and all the other lens elements adjacent thereto, or a clearance may be defined between each of the lens elements and part of the other lens elements adjacent thereto, as shown in FIGS. 4B and 5B. In any of the altered arrangements, balance between the light amount of illumination light on the light receiving plane 91 (and consequently, the light amount of projected light from the projection lens 10), and heat releasing effect of a light source such as the LED arrays 1R, 1G, and 1B can be attained.

(II) In the embodiment, the DMD 9 is used as a light valve for projecting a light image obtained by modulating the incident ray 21 based on an image signal. Alternatively, it is possible to use, as the light valve, a known reflective device, namely, a known micro deflection mirror optical device, which is suitable for allowing the incident ray 21 to be obliquely incident onto the rectangular light receiving plane relative to one side of the light receiving plane by a direction in a certain range including 45° as a center of the range. Further alternatively, it is possible to use a known light valve including a transmissive type, as long as the light valve is suitable to allow the incident ray 21 to be obliquely incident onto the rectangular light receiving plane relative to one side of the light receiving plane by a direction in a certain range including 45° as a center of the range. It should be noted, however, that the DMD is a widely and commercially available device among the micro deflection mirror optical devices, and is easily obtained. Accordingly, use of the DMD is advantageous in reducing the production cost of the illumination apparatus.

(III) In the embodiment, the LED arrays 1R, 1G, and 1B are used as a light source of the invention. Alternatively, it is possible to use a laser device or a known solid-state light emitting device, as a light source segment constituting the light source, in place of the LED 31. Since a compact solid-state light emitting device is easily available, the solid-state light emitting device is suitable for miniaturization of the illumination apparatus and the video projection display system. Further, the solid-state light emitting device has a long effective life, and handling thereof is easy. Among these, since the LED 31 is inexpensive, use of the LED leads to reduction of the production cost of the light source. Further, since the laser device generates high-directional light, a strong convergence property is not required for the condenser lens groups 2R, 2G, and 2B. Accordingly, the construction of the condenser lens groups 2R, 2G, and 2B can be simplified.

(IV) In the embodiment, the arrangement shown in FIG. 1 is used as the illumination optical system for forming an optical path from the first fly-eye lenses 3R, 3G, and 3B up to the DMD 9. Alternatively, as explained in the foregoing section where the principle of the illumination optical system has been described in a simplified manner referring to FIGS. 3A through 3C, the arrangement of the illumination optical system is not limited to the one shown in FIG. 1, as far as rays from the light source transmitted through the respective lens elements 33 are converged in such a manner as to be obliquely incident onto the rectangular light receiving plane 91.

(V) In the embodiment, the LED arrays 1R, 1G, and 1B are used as a light source for generating light of three colors. Alternatively, it is possible to use a light source for generating light of white color such as a white LED array. In such an altered arrangement, a monochromatic light image is obtained as the projected ray 23. Further, in the altered arrangement, the dichroic prism 4 constituting the illumination optical system can be omitted. Further alternatively, it is possible to use LED arrays for generating light of three colors from each other (namely, three different wavelengths from each other), in place of using the LED arrays for generating light of red, green, and blue corresponding to three primary colors. Thereby, a colored optical image other than an image of a natural color can be projected.

(VI) In the embodiment, described is a case that the shape and the arrangement pattern of the lens elements are identical to each other among the first fly-eye lenses 3R, 3G, and 3B, and the second fly-eye lens 5. Alternatively, as described before, the shape and the arrangement pattern of the lens elements may be different from each other. Accordingly, the positional relation between the center of each of the lens elements constituting the first fly-eye lens 3R (3G or 3B), and that of the corresponding LED of the LED array 1R (1G or 2B) may be displaced from each other in front view. It is preferable to displace the center of each of the LEDs constituting the LED array 1R (1G or 1B) and the center of the corresponding lens element of the first fly-eye lens 3R (3G or 3B) from each other in light of the relation between the shape and the arrangement pattern of the lens elements among the first fly-eye lenses 3R, 3G, and 3B, and the second fly-eye lens 5.

Likewise, it is not necessarily required that the center of each of the lens elements constituting the condenser lens group 2R (2G or 2B) and the center of the corresponding lens element of the first fly-eye lens 3R (3G or 3B) coincide with each other in front view. However, preferably, the center of each of the LEDs constituting the LED array 1R (1G or 1B), the center of the corresponding lens element of the condenser lens 2R (2G or 2B), and the center of the corresponding lens element of the first fly-eye lens 3R (3G or 3B) coincide with each other in front view. Such an arrangement simplifies the positional relation among the corresponding elements, and facilitates designing of the optical system.

(VII) Preferably, the first fly-eye lens 3R (3G or 3B) may be an integrally molded product produced by integrally molding the individual lens elements. Thereby, the first fly-eye lens 3R (3G or 3B) with a high measurement precision is easily obtained. Similarly, the same idea is applicable to production of the second fly-eye lens 5.

Figure 7:
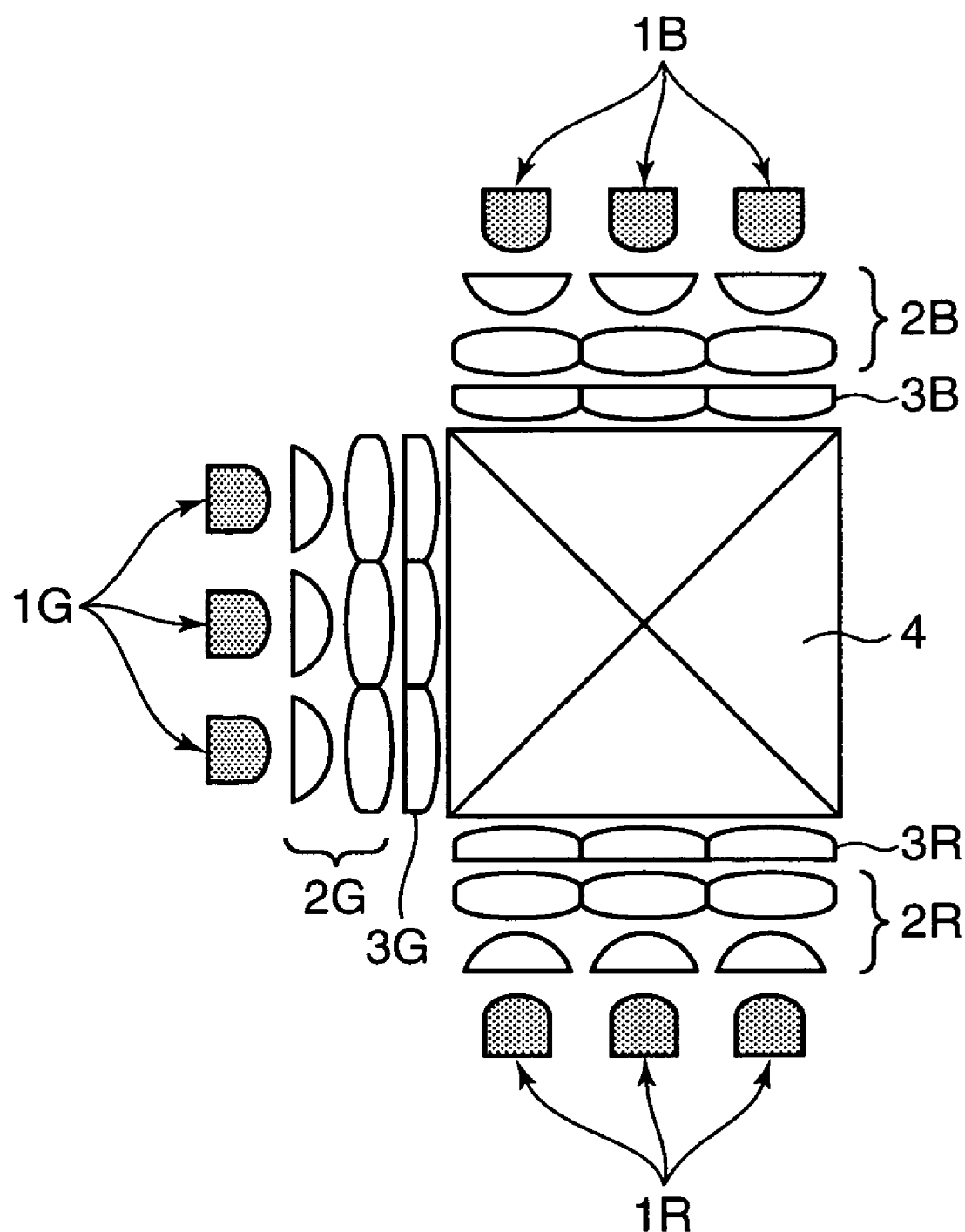
FIG. 7 is a schematic diagram showing a modification of a condenser lens group.

(VIII) It may be possible to form the condenser lens groups 2R, 2G, and 2B into a so-called "combination lens" as shown in FIG. 7. Specifically, lens elements arrayed in a matrix as constituent elements of the condenser lens group 2R (2G or 2B) may be prepared in plural groups, wherein the respective groups of lens elements are opposed to each other. In other words, the condenser lens group 2R (2G or 2B) may be prepared in a plurality of layers each formed of a lens element array. Such an arrangement facilitates designing of an optical system which converges light rays generated in the LED array in a wide range, and guide them substantially in parallel directions to each other precisely. Furthermore, a condenser lens group having a high measurement precision can be easily produced by integrally molding at least one group of lens elements arrayed in a matrix in the condenser lens groups.

(IX) As mentioned above, the illumination optical system is generally designed in such a manner that the effective area 30 has a square shape to effectively utilize the aperture of the projection lens 10. However, the arrangement pattern shown in FIG. 4B or FIG. 5B makes it possible to effectively and discretely arrange the lens elements 33 in the effective area 30 even if the effective area 30 has a rectangular shape other than the square shape.

A brief explanation of various aspects of the present invention will be given below.

(1) An aspect of the present invention is directed to an illumination apparatus comprising: a light source including a group of light source segments arranged in an array; a lens array including a group of condenser lenses arrayed as opposed to the group of light source segments, and a group of rectangular lens elements arrayed as opposed to the group of condenser lenses, each of the lens elements converging a light ray that has been generated in the opposing light source segment and has been transmitted through the opposing condenser lens; and an illumination optical system which converges the rays that have been transmitted through the lens elements in such a manner that the rays are obliquely and superimposedly incident onto an illumination plane one over the other, wherein the lens elements are arrayed in a rectangular effective area with a clearance from each other, the effective area being defined by the illumination optical system as an area capable of arranging the lens elements, and one side of each of the lens elements being tilted relative to one side of the effective area by 45°.

With the illumination apparatus having the arrangement (1), obtained is a bundle of rays converged by the group of condenser lenses arrayed as opposed to the group of light source segments. Further, a bundle of rays each having a rectangular shape in cross section are superimposedly incident onto the illumination plane one over the other by the group of rectangular lens elements arrayed in the effective area as opposed to the group of condenser lenses, and the downstream-located illumination optical system. Thereby, the illumination plane is illuminated with the bundle of rays each having a rectangular shape in cross section with the light amount which is an accumulative light amount of the light source segments.

Further, since the one side of each of the rectangular lens element is tilted relative to the one side of the effective area by 45°, the bundle of rays are superimposedly and obliquely incident onto the illumination plane with a direction of about 45° with respect to one side of each irradiated ray having a rectangular shape in cross section. Accordingly, the illumination apparatus having the arrangement (1) is suitable for use in a reflective-device-incorporated video projection display system having a micro mirror array as a light valve on the illumination plane.

Furthermore, since a clearance is defined by the lens elements adjacent to each other, the opposing light source segments are arrayed with a certain distance from each other. Thereby, release of heat generated in the light source segments is promoted, thereby improving heat releasing effect of the light source. In the case where the rectangular lens elements are arrayed in the effective area with a title angle of 45°, generally, there is left a so-called useless area, namely, an area where the lens elements cannot be arranged, around the group of lens elements within the effective area, even if the lens elements are arrayed with a possible maximum density substantially without a clearance. However, the lens elements can be discretely arranged in the effective area including the useless area by arranging the lens elements with a clearance.

In this way, by arranging the lens elements with a clearance, heat releasing effect of the light source can be raised while securing the light amount of illumination light, depending on the arrangement pattern. Further, generally, balance between the light amount of illumination light onto the illumination plane, and heat releasing effect of the light source can be achieved by arranging the lens elements with a clearance. Throughout the specification and claims, the expression "lens elements are arrayed or arranged with a clearance" not only embraces an arrangement pattern, wherein a clearance is defined between each of the lens elements and all the other lens elements adjacent thereto, but also embraces an arrangement pattern, wherein a clearance is defined between each of the lens elements and part of the other lens elements adjacent thereto, as shown in FIGS. 4B and 5B.

(2) In the illumination apparatus having the arrangement (1), preferably, an aspect ratio of each of the lens elements is less than 2, and the lens elements are arrayed along two sides of the effective area orthogonal to each other with a pitch of $\sqrt{2} \cdot V$ where V represents a length of a shorter side of each of the lens elements.

In the illumination apparatus having the arrangement (2), the lens elements each having the aspect ratio of less than 2 are arrayed with a pitch of $\sqrt{2} \cdot V$ along the two sides of the effective area orthogonal to each other where V represents the length of the shorter side of each of the lens elements. In this arrangement, the lens elements can be efficiently and discretely arrayed in the effective area by utilizing the useless area. As a result, heat releasing effect of the light source can be raised, while securing the light amount of illumination light.

(3) In the illumination apparatus having the arrangement (1), preferably, an aspect ratio of each of the lens elements is more than 2, and the lens elements are arrayed along two sides of the effective area orthogonal to each other with a pitch of $(1/\sqrt{2}) \cdot H$ where H represents a length of a longer side of each of the lens elements.

In the illumination apparatus having the arrangement (3), the lens elements each having the aspect ratio of larger than 2 are arrayed with a pitch of $(1/\sqrt{2}) \cdot H$ along the two sides of the effective area orthogonal to each other where H represents the length of the longer side of each of the lens elements. In this arrangement, the lens elements can be efficiently and discretely arrayed in the effective area by utilizing the useless area. As a result, heat releasing effect of the light source can be raised, while securing the light amount of illumination light.

(4) Another aspect of the present invention is directed to an illumination apparatus comprising: a light source including a group of light source segments arranged in an array; a lens array including a group of condenser lenses arrayed as opposed to the group of light source segments, and a group of rectangular lens elements arrayed as opposed to the group of condenser lenses, each of the lens elements converging a light ray that has been generated in the opposing light source segment and has been transmitted through the opposing condenser lens; and an illumination optical system which converges the rays that have been transmitted through the lens elements in such a manner that the rays are obliquely and superimposedly incident onto an illumination plane one over the other, wherein the lens elements are arrayed in a rectangular effective area, the effective area being defined by the illumination optical system as an area capable of arranging the lens elements, and one side of each of the lens elements being tilted relative to one side of the effective area by 45°, and wherein an aspect ratio of each of the lens elements is 2, and the lens elements are arrayed along two sides of the effective area orthogonal to each other with a pitch of $\sqrt{2} \cdot V$ where V represents a length of a shorter side of each of the lens elements.

With the illumination apparatus having the arrangement (4), similar to the same reason as in the arrangement (1), the illumination apparatus is suitable for use in a reflective-device-incorporated video projection display system having a micro mirror array as a light valve on the illumination plane. Further, the lens groups each having the aspect ratio of 2 are arrayed with a pitch of $\sqrt{2} \cdot V$ along the two sides of the effective area orthogonal to each other where V represents the length of the shorter side of each of the lens elements. With this arrangement, the lens elements can be arranged in the effective area by using the effective area maximally and substantially without a clearance to each other. Namely, the light amount of illumination light can be raised by maximally utilizing the effective area. This means that the light amount of illumination light can be raised without increasing the dimension of the illumination apparatus. This arrangement pattern is proposed to prioritize the light amount of illumination light over heat releasing effect while maximally utilizing the effective area, and provides one option of the arrangement patterns in the case where each of the lens elements has the aspect ratio of 2, considering balance between the light amount of illumination light, and heat releasing effect.

(5) In the illumination apparatus having any one of the arrangements (1) to (4), preferably, the light source segments are arrayed with the same pitch as the lens elements.

In the illumination apparatus having the arrangement (5), since the light source segments are arrayed with the same pitch as the lens elements, the positional relation among the light source segments, the condenser lenses, and the lens elements is simplified. This arrangement facilitates designing of the optical system.

(6) In the illumination apparatus having any one of the arrangements (1) to (5), preferably, the condenser lenses are arrayed with the same pitch as the lens elements.

In the illumination apparatus having the arrangement (6), since the condenser lenses are arrayed with the same pitch as the lens elements, the positional relation among the light source segments, the condenser lenses, and the lens elements is simplified. This arrangement facilitates designing of the optical system.

(7) In the illumination apparatus having any one of the arrangements (1) to (6), preferably, the group of lens elements is an integrally molded product.

In the illumination apparatus having the arrangement (7), since the lens element group is the integrally molded product, the lens element group having a high measurement precision is easily obtained, and adjustment in assembling is simplified.

(8) In the illumination apparatus having any one of the arrangements (1) to (7), preferably, each of the condenser lenses is constituted of plural lens elements opposing to each other so that the group of condenser lenses has a plurality of layers each formed of a lens element array, and at least one of the layers is an integrally molded product.

In the illumination apparatus having the arrangement (8), since each of the condenser lenses is constituted of a group of lens elements opposing to each other, namely, a so-called "combination lens" is used, designing of an optical system of converging light rays generated in the light source segments in a wide range, and guiding them substantially in parallel directions to each other precisely is easy. Furthermore, since at least one group of arrayed lens elements in the group of condenser lenses is an integrally molded product, the group of condenser lenses having a high measurement precision can be easily produced, and adjustment in assembling is simplified.

The following are examples in which at least one group of arrayed lens elements in the group of condenser lenses is an integrally molded product. A first example is that a first group of lens elements, i.e. a first layer, is an integrally molded product in the case where the group of condenser lenses consists of the first group of lens elements and a second group of lens elements. A second example is that first and second groups of lens elements, i.e. first and second layers, are each formed into an integrally molded product in the case where the group of condenser lenses consists of the first group of lens elements, the second group of lens elements, and a third group of lens elements. A third example is that first and second groups of lens elements are formed into an integrally molded product in the case where the group of condenser lenses consists of the first group of lens elements, the second group of lens elements, and a third group of lens elements.

(9) In the illumination apparatus having any one of the arrangements (1) to (8), preferably, the light source includes a first light source, a second light source, and a third light source which generate light rays of three colors having different wavelengths from each other, respectively; and wherein the illumination optical system includes a color synthesizing unit which is arranged on an optical path from the first, the second, and the third light sources up to the illumination plane to synthesize the rays of three colors.

In the illumination apparatus having the arrangement (9), the first, the second, and the third light sources generate light rays of three colors having different wavelengths from each other, respectively, and the color synthesizing unit arranged at an appropriate position on the optical path extending to the illumination plane synthesizes the light rays of three colors. Thereby, the illumination plane is illuminated with colored illumination light.

(10) In the illumination apparatus having the arrangement (9), preferably, the three colors are red, green, and blue.

In the illumination apparatus having the arrangement (10), since the three colors of rays generated in the first, the second, and the third light sources are red, green, and blue, the invention is suitable for use in a video projection display system of projecting an image of a natural color.

(11) In the illumination apparatus having the arrangement (9) or (10), preferably, the illumination apparatus further comprising a light source controller which successively turns on the first, the second, and the third light sources by timesharing.

In the illumination apparatus having the arrangement (11), since the light source controller successively turns on the first, the second, and the third light sources of generating the light rays of three colors individually by timesharing, a video projection display system of projecting a colored optical image can be configured by arranging, on the illumination plane, a light valve which modulates illumination light in synchronism with turning on of the first, the second, and the third light sources. In other words, the illumination apparatus having the arrangement (11) is suitable for use in a video projection display system of projecting a colored optical image.

(12) In the illumination apparatus having any one of the arrangements (1) to (11), preferably, the light source segment includes a light emitting diode.

In the illumination apparatus having the arrangement (12), since the light source segment includes an inexpensive light emitting diode, the light source can be produced at a low cost.

(13) In the illumination apparatus having any one of the arrangements (1) to (11), preferably, the light source segment includes a laser light source.

In the illumination apparatus having the arrangement (13), since the light source segment includes a laser light source, high-directional light is obtainable from the light source segment. As a result, a strong convergence property is not required for the condenser lenses, which makes it possible to simplify the construction of the condenser lens group.

(14) Still another aspect of the present invention is directed to a video projection display system comprising: the illumination apparatus having any one of arrangements (1) to (13); a light valve which is arranged on the illumination plane of the illumination apparatus; and a projection optical system which projects an outgoing ray from the light valve.

In the video projection display system having the arrangement (14), illumination light from the illumination apparatus is modulated by the light valve, and an outgoing ray derived from the modulated light is projected by the projection optical system. Further, since the illumination apparatus is the inventive illumination apparatus, balance between the light amount of projected light, and heat releasing effect of the light source can be attained.

(15) In the video projection display system having the arrangement (14), preferably, the light valve includes a micro deflection mirror optical device.

In the illumination apparatus having the arrangement (15), since the light valve includes a micro deflection mirror optical device, the light amount of the projected light image can be increased without increasing the light amount of the light source.

(16) In the video projection display system having the arrangement (15), preferably, the light valve includes a digital micro mirror device.

In the illumination apparatus having the arrangement (16), since the light valve is a widely and commercially available digital micro mirror device, production cost of the illumination apparatus can be reduced.

As mentioned above, the illumination apparatus of the invention makes it possible to achieve balance between the light amount of projected light onto the illumination plane, and heat releasing effect of the light source (see the above arrangements (1) through (13)). Accordingly, the inventive illumination apparatus and the inventive video projection display system contribute to realization of a compact video projection display system with a high projected light amount.

This application is based on Japanese Patent Application No. 2004-104413 filed on Mar. 31, 2004, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An illumination apparatus comprising:
a light source including a group of light source segments arranged in an array;
a lens array including a group of condenser lenses arrayed as opposed to the group of light source segments, and a group of lens elements arrayed as opposed to the group of condenser lenses, each of the lens elements converging a light ray that has been generated in the opposing light source segment and has been transmitted through the opposing condenser lens; and
an illumination optical system which guides the rays that have been transmitted through the lens elements in such a manner that the rays fall an illumination plane at a predetermined angle of incidence,
wherein the lens elements are arrayed in a rectangular effective area with a clearance from each other, the effective area being defined by the illumination optical system as an area capable of arranging the lens elements and having a shape of a rectangle whose one side extends along an X-axis, and each of the lens elements having a shape of a rectangle whose longitudinal axis intersects the X-axis at 45°, and an aspect ratio of each of the lens elements is less than 2, and the lens elements are arrayed along two sides of the effective area orthogonal to each other with a pitch of $\sqrt{2}\cdot V$ where V represents a length of a shorter side of each of the lens elements.

2. The illumination apparatus according to claim 1, wherein the light source segments are arrayed with the same pitch as the lens elements.

3. The illumination apparatus according to claim 1, wherein the condenser lenses are arrayed with the same pitch as the lens elements.

4. The illumination apparatus according to claim 1, wherein the group of lens elements is an integrally molded product.

5. The illumination apparatus according to claim 1, wherein each of the condenser lenses is constituted of plural lens elements opposing to each other so that the group of condenser lenses has a plurality of layers each formed of a lens element array, and at least one of the layers is an integrally molded product.

6. The illumination apparatus according to claim 1, wherein the light source includes
   a first light source, a second light source, and a third light source which generate light rays of three colors having different wavelengths from each other, respectively; and
wherein the illumination optical system includes
   a color synthesizing unit which is arranged on an optical path from the first, the second, and the third light sources up to the illumination plane to synthesize the rays of three colors.

7. The illumination apparatus according to claim 6, wherein the three colors are red, green, and blue.

8. The illumination apparatus according to claim 6, further comprising a light source controller which successively turns on the first, the second, and the third light sources by timesharing.

9. The illumination apparatus according to claim 1, wherein the light source segment includes a light emitting diode.

10. The illumination apparatus according to claim 1, wherein the light source segment includes a laser light source.

11. A video projection display system comprising:
   the illumination apparatus of claim 1;
   a light valve which is arranged on the illumination plane of the illumination apparatus; and
   a projection optical system which projects an outgoing ray from the light valve.

12. The video projection display system according to claim 11, wherein the light valve includes a micro deflection mirror optical device.

13. The video projection display system according to claim 12, wherein the light valve includes a digital micro mirror device.

14. An illumination apparatus comprising:
   a light source including a group of light source segments arranged in an array;
   a lens array including a group of condenser lenses arrayed as opposed to the group of light source segments, and a group of lens elements arrayed as opposed to the group of condenser lenses, each of the lens elements converging a light ray that has been generated in the opposing light source segment and has been transmitted through the opposing condenser lens; and
   an illumination optical system which guides the rays that have been transmitted through the lens elements in such a manner that the rays fall an illumination plane at a predetermined angle of incidence,
wherein the lens elements are arrayed in a rectangular effective area with a clearance from each other, the effective area being defined by the illumination optical system as an area capable of arranging the lens elements and having a shape of a rectangle whose one side extends along an X-axis, and each of the lens elements having a shape of a rectangle whose longitudinal axis intersects the X-axis at 45°, and an aspect ratio of each of the lens elements is more than 2, and the lens elements are arrayed along two sides of the effective area orthogonal to each other with a pitch of $(1/\sqrt{2}) \cdot H$ where H represents a length of a longer side of each of the lens elements.

15. The illumination apparatus according to claim 14, wherein the light source segments are arrayed with the same pitch as the lens elements.

16. The illumination apparatus according to claim 14, wherein the condenser lenses are arrayed with the same pitch as the lens elements.

17. The illumination apparatus according to claim 14, wherein the group of lens elements is an integrally molded product.

18. The illumination apparatus according to claim 14, wherein each of the condenser lenses is constituted of plural lens elements opposing to each other so that the group of condenser lenses has plurality of layers each formed of a lens element array, and at least one of the layers is an integrally molded product.

19. The illumination apparatus according to claim 14, wherein the light source includes
   a first light source, a second light source, and a third light source which generate light rays of three colors having different wavelengths from each other, respectively; and
wherein the illumination optical system includes
   a color synthesizing unit which is arranged on an optical path from the first, the second, and the third light sources up to the illumination plane to synthesize the rays of three colors.

20. The illumination apparatus according to claim 19, wherein the three colors are red, greed, and blue.

21. The illumination apparatus according to claim 19, further comprising a light source controller which successively turns on the first, the second, and the third light sources by timesharing.

22. The illumination apparatus according to claim 14, wherein the light source segment includes a light emitting diode.

23. The illumination apparatus according to claim 14, wherein the light source segment includes a laser light source.

24. A video projection display system comprising:
   the illumination apparatus of claim 14;
   a light valve which is arranged on the illumination plane of the illumination apparatus; and
   a projection optical system which projects an outgoing ray from the light valve.

25. The video projection display system according to claim 24, wherein the light valve includes a micro deflection mirror optical device.

26. The video projection display system according to claim 25, wherein the light valve includes a digital micro mirror device.

27. An illumination apparatus comprising:
   a light source including a group of light source segments arranged in an array;
   a lens array including a group of condenser lenses arrayed as opposed to the group of light source segments, and a group of lens elements arrayed as opposed to the group of condenser lenses, each of the lens elements converging a light ray that has been generated in the opposing light source segment and has been transmitted through the opposing condenser lens; and an illumination optical system which guides the rays that have been transmitted through the lens elements in such a manner that the rays fall an illumination plane at a predetermined angle of incidence, wherein the lens elements are arrayed in a rectangular effective area, the effective area being defined by the illumination optical system as an area capable of arranging the lens elements and having a shape of a rectangle whose one side extends along an X-axis, and each of the lens elements having a shape of a rectangle whose longitudinal axis interests the X-axis at 45°, and wherein an aspect ratio of each of the lens elements is 2, and the lens elements are arrayed along two sides of the effective area orthogonal to each other with a pitch of $\sqrt{2} \cdot V$ where V represents a length of a shorter side of each of the lens elements.

28. The illumination apparatus according to claim 27, wherein the light source segments are arrayed with the same pitch as the lens elements.

29. The illumination apparatus according to claim 27, wherein the condenser lenses are arrayed with the same pitch as the lens elements.

30. The illumination apparatus according to claim 27, wherein the group of lens elements is an integrally molded product.

31. A video projection display system comprising:

the illumination apparatus of claim 27;

a light valve which is arranged on the illumination plane of the illumination apparatus; and a projection optical system which projects an outgoing ray from the light valve.

* * * * *